United States Patent
Arbone et al.

(10) Patent No.: US 9,940,267 B2
(45) Date of Patent: Apr. 10, 2018

(54) COMPILER GLOBAL MEMORY ACCESS OPTIMIZATION IN CODE REGIONS USING MOST APPROPRIATE BASE POINTER REGISTERS

(71) Applicant: FREESCALE SEMICONDUCTOR, INC., Austin, TX (US)

(72) Inventors: Ciprian Arbone, Bucharest (RO); Bogdan Florin Ditu, Ploiesti (RO)

(73) Assignee: NXP USA, Inc., Austin, TX (US)

( * ) Notice: Subject to any disclaimer, the term of this patent is extended or adjusted under 35 U.S.C. 154(b) by 34 days.

(21) Appl. No.: 15/267,835

(22) Filed: Sep. 16, 2016

(65) Prior Publication Data

US 2017/0337142 A1    Nov. 23, 2017

(30) Foreign Application Priority Data

May 17, 2016 (RO) ...................................... 16-0347

(51) Int. Cl.
  *G06F 12/00* (2006.01)
  *G06F 12/14* (2006.01)
  *G06F 12/06* (2006.01)

(52) U.S. Cl.
  CPC ...... *G06F 12/1441* (2013.01); *G06F 12/0692* (2013.01); *G06F 2212/1041* (2013.01); *G06F 2212/1052* (2013.01)

(58) Field of Classification Search
  None
  See application file for complete search history.

(56) References Cited

U.S. PATENT DOCUMENTS

2016/0062751 A1*  3/2016  Oprea .................. G06F 8/4441
                                                       717/152

OTHER PUBLICATIONS

Davis, Greg: "Back to the Basics: Compiler Optimization for Smaller, Faster Embedded Application Code", Webpage: http://www.embedded.com/design/debug-and-optimization./4025587/Back-to-the-Basics-Compiler-optimization-for-smaller-faster-embedded-application-code.
McIntosh, Nathaniel et al.: "Whole-Program Optimization of Global Variable Layout", Webpage: http://www.cs.virginia.edu/~pact2006/program/pact2006/pact20061.pdf.
IBM, "XL C/C++Programming Guide", pp. 1-1044.

* cited by examiner

*Primary Examiner* — Duc Doan

(57) ABSTRACT

A processing device includes a target processor instruction memory to store a plurality of target processor instructions that include a plurality of global memory access instructions. The processing device further includes a compiler to communicate with the target processor instruction memory, the compiler including: a global variable candidate detection module to identify a global memory access instruction within a set of code regions that use a set of global variable candidates to access a global memory, and a memory access optimization module to modify the global memory access instruction, wherein the modified global memory access instruction utilizes an unused base pointer register of a set of unused base pointer register candidates within the set of code regions, a global variable from the set of global variable candidates to be used as a base address, and an offset relative to the base address to access the global memory.

20 Claims, 4 Drawing Sheets

COMPILER GLOBAL MEMORY ACCESS OPTIMIZATION IN CODE REGIONS USING MOST APPROPRIATE BASE POINTER REGISTERS

FIELD OF THE DISCLOSURE

This disclosure generally relates to data processing and in particular to a method for compiler global memory access optimization.

BACKGROUND

A processor core can execute global memory access instructions of a particular computer program that read data from a set of global memory addresses, that write data to the set of global memory addresses, or that both read and write data to the set of global memory addresses, where the global memory access instructions of each part of the particular computer program utilize the same set of global memory addresses regardless of if each part was compiled separately from each other. A subset of global memory addresses can be allocated to a small global data area of a particular data processor and a general purpose register of the particular data processor can be reserved to point into this area. Each global memory access instruction can utilize this general purpose register plus an offset to read and/or write data from/to each global variable allocated to the small global data area. However, the general purpose register needs to be preserved across all routines, e.g., all routines must use this register for the same purpose, to avoid becoming an Application Binary Interface (ABI) issue. It can also be difficult to select which subset of the global memory addresses should be allocated to the small global data area due to its limited size.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Embodiments of the present invention search for instructions to be executed by a particular target processor device to determine which instructions are global memory access instructions, where the search can be performed by a compiler that is executed by another processor device. The compiler then determines a set of global memory addresses, which can correspond to global variables, of the global memory access instructions that are candidates for utilization during global memory access optimization of the global memory access instructions. For example, a particular global variable is a candidate for utilization when it is determined that the particular global variable is: part of the same section within the global memory layout, marked as "extern", which indicates a global variable is a variable defined outside any function block, and a specific address of the particular global variable has been defined. Though it will be appreciated that a global variable can also be determined to be a candidate for utilization even if it is not marked as "extern". Next, the compiler determines a set of registers that are candidates for utilization during memory access optimization. For example, a particular register is a candidate for utilization when it is determined that the particular register can be utilized as a base pointer register, as defined by the architecture of the target processor, and has not been used within a particular basic block of the program flow.

Each global memory access instruction within the particular basic block is evaluated to determine if it is a candidate to be replaced with an optimized global memory access instruction that utilizes a base pointer register and offset to the global variable to be accessed. This determination is based on information about the global variable candidate, the base pointer register candidates, the costs associated with the original global memory access instruction, the costs associated with the optimized global memory access instruction, and the benefits of the optimization. If the original global memory access instruction is to be replaced, it is replaced with the optimized global memory access instruction, allowing the size and speed of the instructions to be improved. Otherwise, the original global memory access instruction is maintained.

Figure 1:
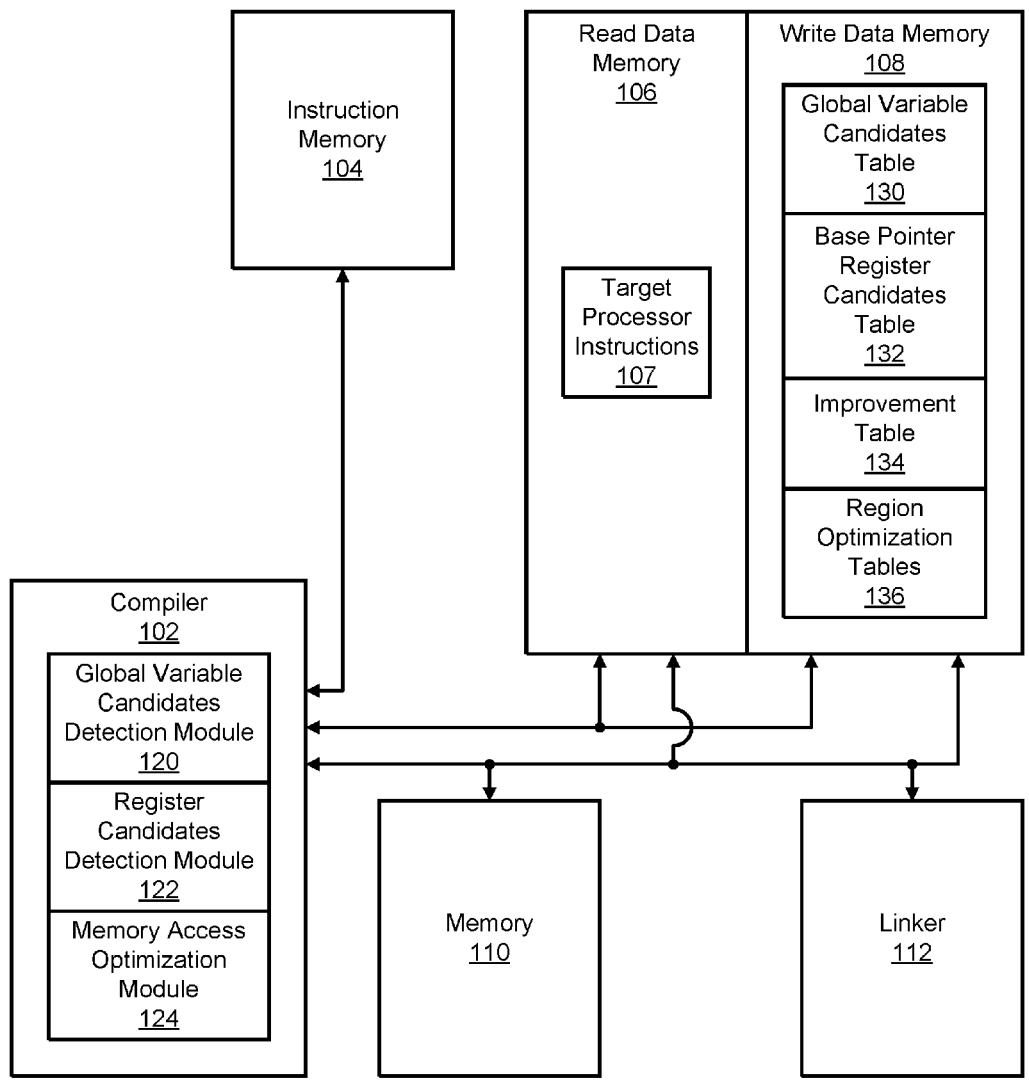
FIG. 1 illustrates a portion of a processor subsystem in accordance with at least one embodiment of the present disclosure.

FIG. 1 illustrates a portion of a processor subsystem 100 in accordance with at least one embodiment of the present disclosure. The processor subsystem 100 includes a compiler 102, an instruction memory 104, a read data memory 106, a write data memory 108, a memory 110, and a linker 112. Compiler 102 is typically implemented by a data processor executing code from an instruction memory, such as from instruction memory 104, and includes a global variable candidate detection module 120, a register candidate detection module 122, and a memory access optimization module 124. The write data memory 108 may store a global variable candidates table 130, a base pointer register candidates table 132, an improvement table 134, and a region optimization tables 136. In an embodiment, global variable candidate detection module 120, register candidate detection module 122, and memory access optimization module 124 can represent hardware components of the processor that execute specific instruction code stored at memory 104, or the like.

A high-level computer program (not shown) can be separated or divided by a software programmer into one or more sections of code, e.g., C code, that can be defined as compilation units. Compiler 102 prepares a low level instruction representation of each compilation unit, e.g., target processor instructions, based on instructions supported by a target processor having a particular processor architecture. The low level instruction representation of each compilation unit includes the assignment of registers to the target processor instructions. Compiler 102 then performs memory access optimization on the initial low level instruction representation. Compiler 102 then creates an object file for each associated compilation unit. After compiler 102 creates each object file, linker 112 links all of the object files for the one or more compilation units to create the computer program that can be run on the target processor.

During operation, compiler 102 operates to determine whether target processor instructions 107 of a particular low level instruction representation for a compilation unit can be optimized. According to an embodiment, compiler 102 can analyze target processor instructions 107 and can detect those global memory access instructions, also referred herein as global variable access instructions, which are candidates for possible optimization. In an embodiment, the possible optimization of the global memory access instructions can involve replacing the global memory access instructions with instructions that access a global memory through a set of base pointer registers. A global variable is a variable with global scope throughout the computer program that can be utilized by the one or more compilation units. A target processor instruction within the particular compilation unit can include a global memory operand that allows the target processor instruction to access the global variable utilizing the address of the global variable.

An exemplary compilation unit of a function "foo" that includes C code statements that access various global variables is provided below:

```
static int        i1, i2, i3, i4;
static int        i5, i6, i7
static const int  c1, c2, c3;
int dummy(int);
Void foo( ) {
    if (i1 >= 0)
        i2 = i3 + 25;
    else {
        i2 = i3 - 25;
        dummy(i2);
        i4 = i7 * c1 * c2;
        i5 = i7 * c1 * c3;
    }
    i6 = i2 * c2;
}
```

Figure 2:
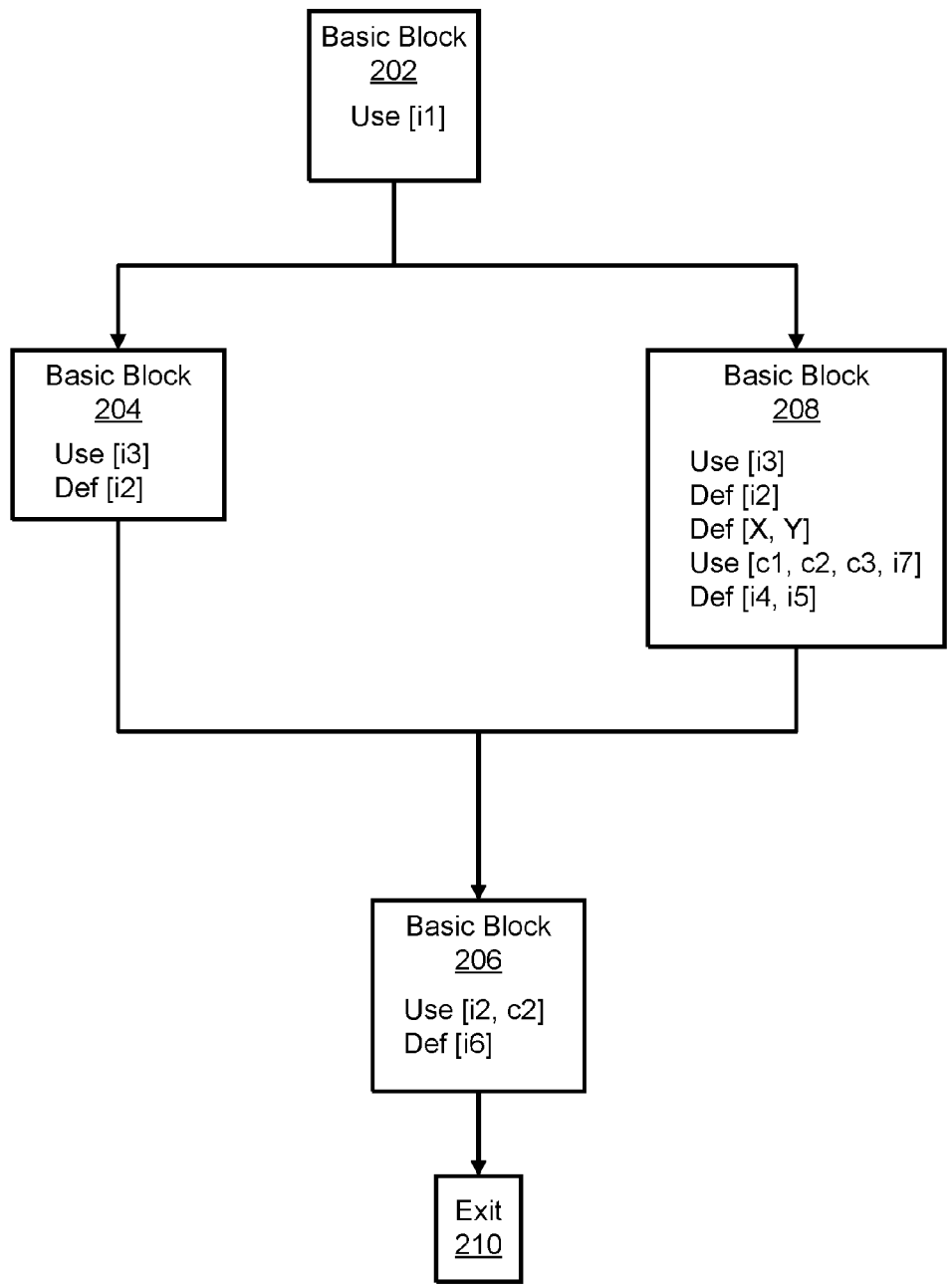
FIG. 2 illustrates an exemplary set of basic blocks and global variables that are defined or used in each basic block of a C function "foo" identified by a compiler in accordance with at least one embodiment of the present disclosure.

The above exemplary C function, 'foo' has multiple global variables including i1, i2, i3, i4, i5, i6, i7, c1, c2, and c3 that are accessed by various C code statements of 'foo'. The particular low level instruction representation of 'foo' includes global memory access instructions to access the multiple global variables and various architecture registers that have been allocated to the various target processor instructions. These global variables have also been assigned to a particular memory layout of the target processor. Compiler 102 then performs global variable access optimization on the non-optimized low level instruction representation to produce the optimized target processor instructions 107 of 'foo', discussed in further detail below. Compiler 102 analyzes target processor instructions 107 to identify basic blocks within the compilation unit. As used herein, a basic block is a straight-line instruction sequence that has one entry point and one exit point, where only the last instruction in the sequence can cause the program to begin executing instructions in a different basic block. As such, when the first instruction in a basic block is executed, the remaining instructions of the basic block are executed exactly once, in order. Compiler 102 also identifies the basic blocks that each global variable is defined in or used within the low level instruction representation. For example, compiler 102 can identify an exemplary set of basic blocks and global variables 200, as shown in FIG. 2, that are defined or used in each basic block of the low level instruction representation of the function "foo" identified by compiler 102. A global variable is used in a basic block when its value is utilized by a particular target processor instruction that implements a particular C statement, e.g., as a parameter of a C function call or the right side of a C assignment statement, and its value is not updated by any target processor instruction that implements a C statement within the basic block. A global variable is defined in a basic block when its value is updated by any target processor instruction that implements a C statement within the basic block.

FIG. 2 shows the exemplary set of basic blocks and global variables 200 of the function 'foo' including four basic blocks 202, 204, 206, and 208 in accordance with at least one embodiment of the present disclosure. Basic block 202 includes the instructions of target processor instructions 107 that implement the C statement "if (i1>=0)" that uses the global variable i1, as indicated by "Use [i1]". Basic block 204 includes the instructions that implement the C statement "i2=i3+25" that uses the global variable i3 and defines the global variable i2 to be i3+25, as indicated by "Use [i3]" and "Def [i2]", respectively. Basic block 206 includes the instructions that implement the C statement "i6=i2*c2" that uses global variables i2 and c2 and defines the global variable i6, as indicated by "Use [i2, c2]" and "Def [i6]", respectively. Similarly, basic block 208 includes the instructions that implement the C statements "i2=i3−25;", "dummy (i2)", "i4=i7*c1*c2;", and "i5=i7*c1*c3;". Global variables i3, c1, c2, c3, and i7 are used, global variables i2, i4, and i5 are defined, and registers X and Y are defined in basic block 208 as indicated by "Use [i3]", "Use[c1, c2, c3, i7]", "Def[i2]", "Def [i4, i5]", and "Def[X, Y], respectively. The C statement "dummy(i2)" is a function call from the code of block 208 that has global variable i2 as a parameter of the function "dummy(i2)". In an embodiment, compiler 102 has previously defined registers X and Y as part of the particular target processor instructions 107 to implement the C statements of basic block 208 of the function 'foo'.

After identifying the basic blocks of the particular compilation unit, compiler 102 further analyzes the instructions of the basic blocks to determine a set of regions within the program and to determine whether each region is a low pressure region or a high pressure region. As used herein, a low pressure region is a region that includes one or more basic blocks and has available registers that are not used within the region. Compiler 102 analyzes the particular target processor instructions of the basic blocks and all of the previously allocated registers to determine the set of low pressure regions that include one of more basic blocks that have unused base pointer registers.

Figure 3:
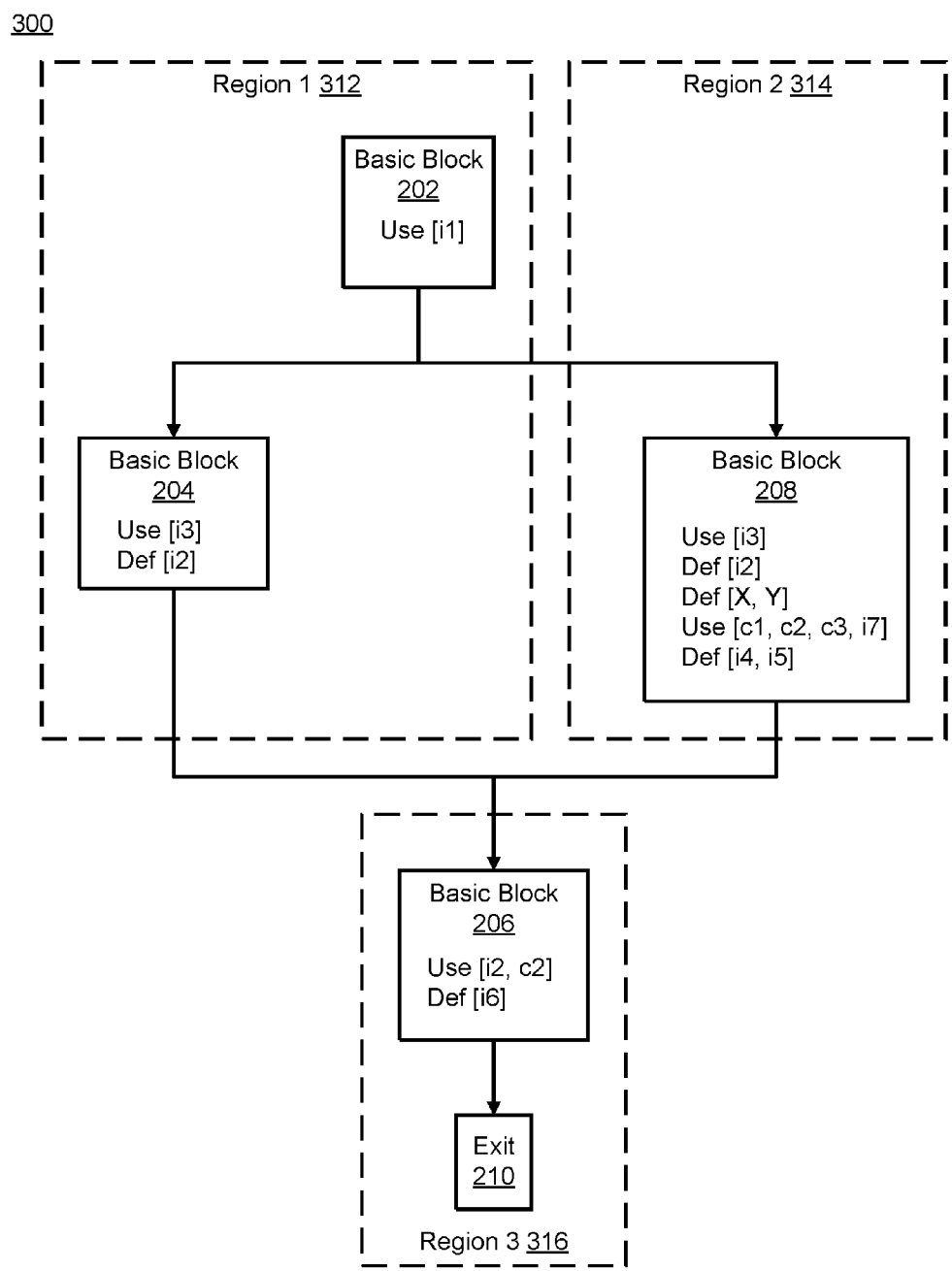
FIG. 3 illustrates an exemplary idiom tree and set of low pressure regions of a C function determined by a compiler in accordance with at least one embodiment of the present disclosure.

FIG. 3 illustrates an exemplary idiom tree and set of low pressure regions 300 of function 'foo' determined by compiler 102 in accordance with at least one embodiment of the present disclosure. As shown, the exemplary idiom tree and set of low pressure regions 300 includes low pressure region 312, low pressure region 314, and low pressure region 316 of the function 'foo'.

Region 312 includes basic blocks 202 and 204, as indicated by the dotted line box surrounding basic blocks 202 and 204. Similarly, region 314 includes basic block 208, and region 316 includes basic block 206 and exit block 210, as indicated by the dotted line boxes surrounding basic block 208, and basic block 206 and exit block 210, respectively. Compiler 102 can utilize techniques well known to those skilled in the art to determine low pressure regions 312, 314, and 316 and which basic blocks each low pressure region should contain. Next, global variable candidate detection module 120 of compiler 102 analyzes the global variables that are declared in the particular compilation unit to determine which global variables are candidates to be utilized for memory access optimization of the associated global variable access instruction. Global variable candidate detection module 120 determines a set of global variables within the global variable access instruction. One way global variable candidate detection module 120 can identify that a particular global variable, of the set of global variables, is a candidate to be utilized in the instruction optimization is by determining if the particular global variable is part of the same data segment/section within the memory layout. This can be determined from pre-processor information provided to compiler 102, such as, a pragma directive and/or pragma operator specified by the C standard, e.g. "pragma DATA_SEG". In an embodiment, the pragma directive and/or pragma operator identifies that the particular global variable belongs to a particular data segment. In this case, linker 112 cannot rearrange the particular global variable within the same data segment/section, its offset will not be changed by linker 112, and as such, the particular global variable is identified as a candidate for utilization. Otherwise, the particular global variable is part of different data segments/sections, its offset cannot be assumed and the particular global variable is not a candidate for utilization.

Global variable candidate detection module 120 can also identify whether a particular global variable is a candidate for utilization by determining if the particular global variable is marked as "extern" and a specific address of the global variable has been defined, e.g. the specific address is defined by using the "@" operator. Otherwise, the global variable is not a candidate for utilization, because the section that the particular global variable belongs to cannot be determined. Global variable candidate detection module 120 can also identifies that a particular global variable is a candidate for utilization by determining that the particular global variable is not marked as "extern".

Global variable candidate detection module 120 next adds each of the candidate global variables to a set of global variable candidates in global variable candidates table 130 at write data memory 108. If the set of global variable candidates in the in global variable candidates table 130 is not empty, i.e. the set has one or more variable candidates for utilization, memory access optimization continues. Otherwise, the set is empty and compiler 102 proceeds to perform low level optimizations without first optimizing the global memory access instructions. In the exemplary C function 'foo' previously described, global variable candidate detection module 120, using the criteria described above, determines that the global variables i1, i2, i3, i4, i5, i6, i7, c1, c2, and c3 are candidates for utilization during optimization of the global memory access instructions and, as such, adds each of them to the set of global variable candidates in global variable candidates table 130.

Next, register candidate detection module 122 of compiler 102 analyzes the registers that are utilized in the particular compilation unit to determine which registers are available for use in the memory access optimization. In an embodiment, register candidate detection module 122 first determines which architecture registers can be utilized as base pointer registers, as defined by the architecture of the target processor. For example, this can be accomplished by accessing a predefined list of registers. Register candidate detection module 122 then analyzes the particular compilation unit to determine each basic block where the base pointer registers have not been used such that these basic blocks are available for use in optimization of the memory access instruction optimization. In the exemplary set of basic blocks and global variables 200 of function 'foo', register candidate detection module 122 determines that registers X and Y can be utilized as base pointer registers and that they have not been used in basic block 208, as previously described. As such, registers X and Y are candidate base pointer registers and register candidate detection module 122 can add them to a set of base pointer registers in base pointer register candidates table 132 stored at write data memory 108. If the set of base pointer registers is not empty and has one or more candidates, e.g. base pointer register candidates X and Y, memory access instruction optimization continues. Otherwise, the set is empty and compiler 102 proceeds to perform low level optimizations without memory access instruction optimization.

When the memory access optimization continues, memory access optimization module 124 determines which memory access instructions within the compilation unit can be optimized based on information in global variable candidates table 130, information in base pointer register candidates table 132, costs associated with the memory access instructions that have memory operands utilizing the addresses of the global variables, and costs associated with the optimized memory access instructions utilizing base pointer registers. Memory access optimization module 124 calculates these costs as part of determining which memory access instructions can be optimized. In an embodiment, these costs can include the size of the original memory access instructions, the size of the optimized memory access instructions, the number of cycles and/or the speed to execute the original, the number of cycles and/or the speed to execute the optimized memory access instructions, the type of global variable base registers such as, a data register or an address register, the type of addressing mode of the global variable memory access operand, e.g. signed, unsigned, and indexed, a particular memory model associated with a memory access operand, e.g. a small, a medium, or a large memory model, and the like.

An exemplary set of memory operands of particular memory access instructions, e.g. memory access instructions of target processor instructions 107, that utilize addresses of the associated global variables, e.g. global variables i1, i2, i3, i4, i5, i6, i7, c1, c2, and c3 of the exemplary C function 'foo' previously described, can be encoded for a particular target architecture as provided below:

op xb x1—opru14, Short Extended (16K) instruction form.

op xb x1 x2—opru18, Medium Extended (256K) instruction form.

op xb x1 x2 x3—opru24, Long Extended (16M) instruction form.

The above exemplary set of memory operands represent the encoding corresponding to small, medium, or large memory models, where memory operand "opru14" represents the small memory model, "opru18" represents the medium memory model, and "opru24" represents the large memory model.

An exemplary set of memory operands that utilize indexed addressing modes, i.e. utilizing base pointer registers and offsets, of the global variables of particular memory access instructions, e.g. memory access instructions of target processor instructions 107 that utilize index addressing modes of the associated global variables, e.g. global variables i1, i2, i3, i4, i5, i6, i7, c1, c2, and c3 of the exemplary C function 'foo' previously described, can be encoded for a particular target architecture as provided below:

op xb—(opru4, xys), Short Offset (0-15) instruction form.

op xb x1—(oprs9, xysp), 9-bit Signed Offset instruction form.

op xb x1 x2—(opru18, Di) 18-bit Unsigned Offset instruction form.

op xb x1 x2 x3—(opr24, xysp) 24-bit Offset instruction form.

The above exemplary set of memory operands that utilize indexed addressing modes includes "(opru4, xys)" for an unsigned index/offset, where "opru4" represents the offset for the small memory model and "xys" represents the registers accepted by the addressing mode, "(oprs9, xysp)" for a 9-bit signed index/offset, where "oprs9" represents the offset for the medium memory model and "xysp" represents the registers accepted by the addressing mode, "(opru18, Di)" for an 18-bit signed index/offset, where "opru 18" represents the offset for the large memory model and "Di" represents the registers accepted by the addressing mode, and "(opr24, xysp)" for a signed index, where "xysp" where "opr24" represents the offset for the large memory model and "xysp" represents the registers accepted by the addressing mode.

Memory access optimization module 124 also calculates the benefits associated with the memory access instructions that can be optimized based on the costs associated with the original memory access instructions and the optimized memory access instructions. Memory access optimization module 124 stores the calculated costs and benefits in an improvement table. An exemplary improvement table 134 of the costs associated with the original memory access instructions and the optimized memory access instructions, and the costs and benefits associated with the optimizations is provided below:

TABLE 1

Improvement table 134

|  | Encoding Size Costs | Opru14 3 Bytes | Opru18 4 Bytes | Opr24 5 Bytes |
|---|---|---|---|---|
| Opru4 | 2 Bytes | 1 Byte | 2 Bytes | 3 Bytes |
| Oprs9 | 3 Bytes |  | 1 Byte | 2 Bytes |
| Opru18 | 4 Bytes |  |  | 1 Byte |
| Opr24 | 5 Bytes |  |  |  |

The above exemplary improvement table 134 shows the encoding size costs associated with the original memory operands, where row 1 includes the original memory operands represented by "opru14", "opru18", and "opr24" and row 2 includes the associated encoding size costs of 3 bytes, 4 bytes, and 5 bytes, respectively. Memory access optimization module 124 also considers the initial cost of a load instruction that loads the base address in a base register when determining the encoding size costs as provided below:

Initial_cost=xy_bp 3:3 //>LD XY, #opr14i/LEA D67, opru14

Initial_cost=xy_bp 3:4 //>LD XY, #opr18i/LEA D67, opru18

Initial_cost=xy_bp 4:5 //>LD XY, #opr24i/LEA D67, opr24

When an address register is utilized as the base register, the encoding size costs are 3 bytes, 3 bytes, and 4 bytes for "opru14", "opru18", and "opr24", respectively. Similarly, when a data register is utilized as the base register, the encoding size costs are 3 bytes, 4 bytes, and 5 bytes for "opru14", "opru18", and "opr24", respectively. Improvement table 134 also shows the encoding size costs associated with the optimized memory operands, where column 1 includes the optimized memory operands represented by "opru4", "oprs9", "opru18, and "opr24" and column 2 includes that associated encoding size costs of 2 bytes, 3 bytes, 4 bytes and 5 bytes, respectively.

Improvement table 134 further shows the encoding size benefits of replacing each of the original memory operands with each one of the optimized memory operands, where the encoding size benefits are equal to the encoding size cost associated with each of the original memory operands minus the encoding size cost associated with each of the optimized memory operands. The encoding size benefits of replacing memory operands "opru14", "opru18", and "opr24" with optimized memory operand "opru4" are 1 byte, 2 bytes, and 3 bytes, respectively. Similarly, the encoding size benefits of replacing memory operands "opru18" and "opr24" with optimized memory operand "oprs9" are 1 byte and 2 bytes, respectively, and the encoding size benefit of replacing memory operand "opr24" with optimized memory operand "opru18" is 1 byte. Empty cells of improvement table 134 indicate that there is no encoding size benefit of the optimization. Improvement table 134 can also include performance costs and benefits, e.g. cycles utilized/speed by the target processor executing each of the original memory access instructions and the optimized memory access instructions, and constraints associated with the optimizations.

After creating the improvement table, such as, for example, improvement table 134, memory access optimization module 124 determines which optimizations to implement. In an embodiment, memory access optimization module 124 considers an optimization if it has a benefit of replacing a memory operand with an optimized memory operand of a candidate global variable, such as, for example, replacing memory operand opr24 that utilize addresses of the associated global variables, e.g. global variables i1, i2, i3, i4, i5, i6, i7, c1, c2, and c3, of function 'foo' with the optimized memory operand opru4 that has an encoding size benefit of 3 bytes as shown in improvements table 134. In an embodiment, memory access optimization module 124 determines which optimizations of the candidate global variables, the candidate base pointer registers, and the number of memory operands of each candidate global variable, offer the most benefit across the particular compilation unit. Once memory access optimization module 124 determines which optimizations to implement, memory access optimization module 124 emits the optimized target instructions and stores them in write data memory 108. Next, compiler 102 performs low level optimizations of the optimized target instructions. In addition, compiler 102 emits a set of pre-linker information to prevent linker 112 from performing stripping to remove any unused global variables and to prevent linker 112 from performing any global variable alignment optimizations during the linking phase. The pre-linker information ensures that linker 112 does not undo any of the memory access optimizations of the optimized target instructions. After emitting the set of pre-linker information, compiler 102 has completed the compilation of the particular compilation unit.

Exemplary region optimization table 136, of FIG. 1, that includes tables 2 and 3 showing the original memory access operands and the optimized memory access operands of the C function 'foo' are provided below:

TABLE 2

Region Optimization Tables 136
Region 312: Id A_0, OpObjectAddr(i3)

| Id | Original Operand | Optimized Operand |
|---|---|---|
| #1 | OpObject(i1) | OpRegIdx(A_0, 4) |
| #2 | OpObject(i3) | OpRegIdx(A_0, 0) |
| #3 | OpObject(i2) | OpRegIdx(A_0, 2) |

Table 2 of the exemplary region optimization tables 136 shows the memory optimizations of global variable i3 within region 312, as shown in FIG. 3, of function 'foo' implemented by memory access optimization module 124. Row 1 of table 2, as represented by the id of "1", includes the original memory operand represented by "OpObject(i1)" and the optimized memory operand represented by "OpRegIdx(A_0, 4)", where the base pointer register of i1 of the optimized memory operand is represented by "A_0" and the offset to i1 is 4. Row 2, as represented by the id of "2", includes the original memory operand represented by "OpObject(i3)" and the optimized memory operand represented by "OpRegIdx(A_0, 0)", where the base pointer register of i3 of the optimized memory operand is represented by "A_0" and the offset to i3 is 0. Row 3, as represented by the id of "3", includes the original memory operand represented by "OpObject(i2)" and the optimized memory operand represented by "OpRegIdx(A_0, 2)", where the base pointer register of i2 of the optimized memory operand is represented by "A_0" and the offset to i2 is 2. In table 2, A_0 corresponds to base pointer register X, and global variables i1, i2, and i3 are within the same segment and as such, share the same base pointer register "A_0"/X.

TABLE 3

Region Optimization Tables 136
Region 314: Id A_0, OpObjectAddr(c3)
Id A_1, OpObjectAddr(i7)

| Id | Original Operand | Optimized Operand |
|---|---|---|
| #1 | OpObject(c1) | OpRegIdx(A_0, 4) |
| #2 | OpObject(c2) | OpRegIdx(A_0, 2) |
| #3 | OpObject(c3) | OpRegIdx(A_0, 0) |
| #4 | OpObject(i7) | OpRegIdx(A_1, 0) |
| #5 | OpObject(i4) | OpRegIdx(A_1, 6) |

Table 3 of the exemplary region optimization tables 136, of FIG. 1, shows the memory optimizations of global variables c3 and i7 within region 314, as shown in FIG. 3, of 'foo' implemented by memory access optimization module 124. Row 1 of table 3, as represented by the id of "1", includes the original memory operand represented by "OpObject(c1)" and the optimized memory operand represented by "OpRegIdx($A_O$, 4)", where the base pointer register of c1 of the optimized memory operand is represented by "A_0" and the offset to c1 is 6. Row 2, as represented by the id of "2", includes the original memory operand represented by "OpObject(c2)" and the optimized memory operand represented by "OpRegIdx(A_0, 2)", where the base pointer register of c2 of the optimized memory operand is represented by "A_0" and the offset to c2 is 8. Row 3, as represented by the id of "3", includes the original memory operand represented by "OpObject(c3)" and the optimized memory operand represented by "OpRegIdx(A_0, 0)", where the base pointer register of c3 of the optimized memory operand is represented by "A_0" and the offset to c3 is 10. Row 4, as represented by the id of "4", includes the original memory operand represented by "OpObject(i7)" and the optimized memory operand represented by "OpRegIdx(A_1, 0)", where the base pointer register of i7 of the optimized memory operand is represented by "A_1" and the offset to i7 is 0. Row 5, as represented by the id of "5", includes the original memory operand represented by "OpObject(i4)" and the optimized memory operand represented by "OpRegIdx(A_1, 6)", where the base pointer register of i4 of the optimized memory operand is represented by "A_1" and the offset to i4 is 6. In table 3, A_0 corresponds to base pointer register X, and global variables c1, c2, and c3 are within the same segment as global variables i1, i2, and i3 and as such, share the same base pointer register "A_0"/X. Similarly, A_1 corresponds to base pointer register Y, and global variables i4 and i7 are within the same segment and as such, share the same base pointer register "A_1"/Y.

Thus, by replacing global memory accesses within a compilation unit program with memory accesses using base pointer registers, compiler 102 generates more size efficient object code and improves the execution speed of the optimized object code.

An exemplary non-optimized low level instruction representation of the function 'foo' is provided below:

```
TBMI.W    i1,*+31           ;abs = 0x00001F
LD        D2,i3
ADD       D2,#25
ST        D2,i2
MULS.WW   D2,i2,c2
ST        D2,i6
RTS
LD        D2,i3
ADD       D2,#-25
ST        D2,i2
JSR       dummy
MULS.WW   D3,i7,c1
MULS.W    D2,D3,c2
ST        D2,i4
MULS.W    D2,D3,c3
ST        D2,i5
BRA       *-58              ;abs = 0x000011
```

The optimized target processor instructions 107 of 'foo' are provided below:

```
LD        X,#i3
TBMI.W    (4,X),*+25        ;abs = 0x00001D
LD        D2,(0,X)
ADD       D2,#25
ST        D2,(2,X)
LD        X,#i6
MULS.WW   D2,(8,X),c2
ST        D2,(0,X)
RTS
LD        D2,i3
ADD       D2,#-25
ST        D2,i2
JSR       dummy
LD        Y,#i7
LD        X,#c3
MULS.WW   D3,(0,Y),(4,X)
MULS.W    D2,D3,(2,X)
ST        D2,(6,Y)
MULS.W    D2,D3,(0,X)
ST        D2,(4,Y)
BRA       *-51              ;abs = 0x00000F
```

Figure 4:
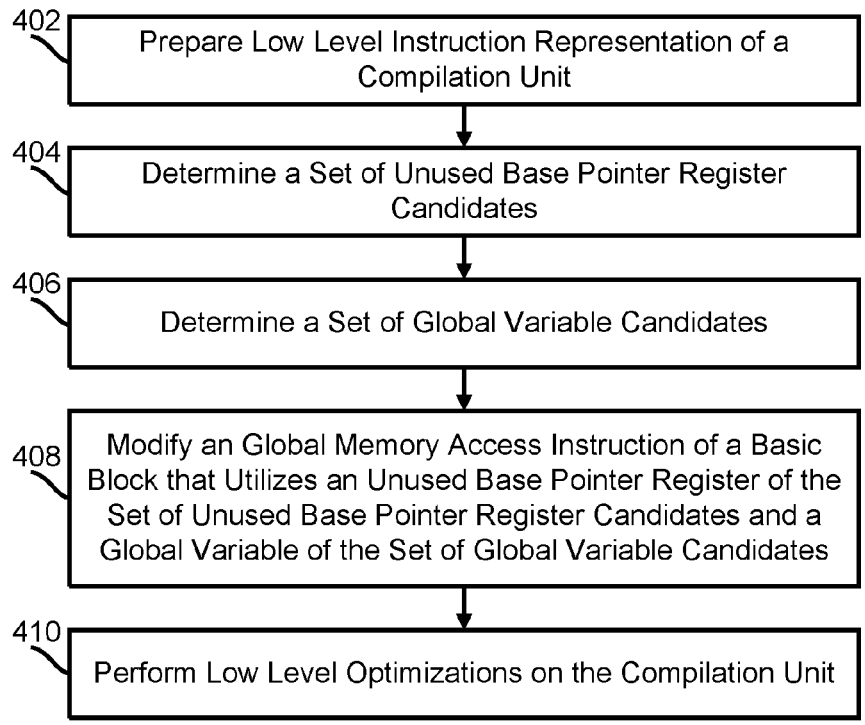
FIG. 4 illustrates a method for compiler global memory access optimization in code regions using most appropriate base pointer registers in accordance with at least one embodiment of the present disclosure.

FIG. 4 illustrates a method for compiler global memory access optimization in code regions using a most appropriate base pointer register in accordance with at least one embodiment of the present disclosure. At block 402, a processing device can prepare a low level instruction representation of a compilation unit. In an embodiment, the processing device can execute a compiler, e.g. compiler 102 of FIG. 1, to prepare the low level instruction representation of the compilation unit. As part of preparing the low level instruction representation, global variables have been assigned to a particular memory layout, the various architecture registers have been allocated to various target processor instructions, the basic blocks have been identified, and a set of code regions have been determined.

At block 404, identification of a set of unused base pointer register candidates is performed, as previously described. Particular registers are unused base pointer register candidates when it is determined that the particular registers can be utilized as base pointer registers, as defined by the architecture of the target processor, and the particular registers have not been used within particular basic blocks of the compilation unit, i.e., they are available. The set of unused base pointer register candidates are added to a base pointer register candidates table, e.g. base pointer register candidates table 132. If no unused base pointer register candidates have been identified, the flow completes without performing memory access optimization. Otherwise, the flow proceeds to block 406.

At block 406, identification of a global memory access instruction within the set of code regions that use a set of global variable candidates to access a global memory is performed. A particular global variable is a global variable candidate when it is determined that the particular global variable is part of the same section within the memory layout, is marked as "extern" and a specific address of the particular global variable has been defined, and is not marked as "extern". In an embodiment, this determination can be made by memory access module 112 of FIG. 1. Global variable candidates are added to a global variable candidates table, e.g. global variable candidates table 130. If no global variable candidates have been identified, the flow completes without performing memory access optimization. Otherwise, the flow proceeds to block 408.

At block 408, a global memory access instruction of a particular basic block is replaced with a global memory access instruction that utilizes an unused base pointer register of the set of unused base pointer register candidates and a global variable of the set of global variable candidates to access the global memory. The global memory access instruction is replaced based on information in the global variable candidates table, the base pointer register candidates table, the costs associated with the global memory access instructions that have memory operands utilizing the addresses of the global variables, the costs associated with the optimized global memory access instructions utilizing base pointer registers, and the benefits of the optimizations, as previously described. In an embodiment, the global memory access instructions can be replaced with the optimized global memory access instructions by memory access optimization module 124 of FIG. 1. At block 410, low level optimizations of the compilation unit are performed, and the flow completes.

According to one aspect, a method is disclosed in accordance with at least one embodiment of the present disclosure. The method includes identifying, by a compiler executing on a processing system, a global memory access instruction within a set of code regions that use a set of global variable candidates to access a global memory. The method also includes modifying, by the compiler executing on the processing system, the global memory access instruction, wherein the modified global memory access instruction utilizes an unused base pointer register of a set of unused base pointer register candidates within the set of code regions, a global variable from the set of global variable candidates to be used as base address, and an offset relative to the base address to access the global memory.

In an embodiment, the method further includes preventing, by the compiler, a linker from removing any global variable. In an embodiment, the method further includes preventing, by the compiler, a linker from aligning any global variable in the section that is optimized. In an embodiment, modifying the global memory access instruction considers the memory model in use from a set of architecture memory models. In embodiment, the method also includes determining a set of associated costs of the modified global memory access instruction and a set of associated costs of the unmodified global memory access instruction. In an embodiment, the associated cost of the modified global memory access instruction is lower than the associated costs of the unmodified global memory access instruction. In an embodiment, modifying the global memory access instruction is based on a set of constraints. In an embodiment, the associated cost of the modified global memory access instruction includes a type of the unused base pointer register, a speed to execute the modified global memory access instruction, and a size of the modified global memory access instruction.

According to another aspect, a processing device is disclosed in accordance with at least one embodiment of the present disclosure. The processing device includes a target processor instruction memory to store a plurality of target processor instructions that include a plurality of global memory access instructions. The processing device further includes a compiler to communicate with the target processor instruction memory, the compiler includes a global variable candidate detection module to identify a global memory access instruction within a set of code regions that use a set of global variable candidates to access a global memory. The compiler also includes a memory access optimization module to modify the global memory access instruction, wherein the modified global memory access instruction utilizes an unused base pointer register of a set of unused base pointer register candidates within the set of code regions, a global variable from the set of global variable candidates to be used as base address, and an offset relative to the base address to access the global memory.

In an embodiment, the compiler also to prevent a linker from removing any global variable. In an embodiment, the compiler further to prevent a linker from aligning any global variable in the section that is optimized. In an embodiment, the modify of the global memory access instruction considers the memory model in used from a set of architecture memory models. In an embodiment, the memory access optimization module further to determine a set of associated costs of the modified global memory access instruction and a set of associated costs of the unmodified global memory access instruction. In an embodiment, the set of associated costs of the modified global memory access instruction is lower than the associated costs of the unmodified global memory access instruction. In an embodiment, modifying the global memory access instruction is based on a set of constraints. In an embodiment, the associated cost of the modified global memory access instruction includes a type of the unused base pointer register, a speed to execute the modified global memory access instruction, and a size of the modified global memory access instruction.

According to another aspect, a method is disclosed in accordance with at least one embodiment of the present disclosure. The method includes identifying, by a compiler executing on a processing system, a global memory access instruction within a set of code regions that use a set of global variable candidates to access a global memory. The method also includes modifying, by the compiler executing on the processing system, the global memory access instruction, wherein the modified global memory access instruction utilizes an unused base pointer register of a set of unused base pointer register candidates within the set of code regions, a global variable from the set of global variable candidates to be used as a base address, and an offset relative to the base address to access the global memory, wherein modifying the global memory access instruction is based on a set of associated costs of the modified global memory access instruction and a set of associated costs of the unmodified global memory access instruction.

In an embodiment, the method further includes preventing, by the compiler, a linker from removing any global variable. In an embodiment, the method also includes preventing, by the compiler, a linker from aligning any global variable in the section that is optimized. In an embodiment, modifying the global memory access instruction considers the memory model in use from a set of architecture memory models.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof. For example, one skilled in the art would appreciate that a data processing system, such as a computer having an instruction based data processor, can be used to implement the analysis described herein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   identifying, by a compiler executing on a processing system, a global memory access instruction within a set of code regions that include a set of global variable candidates to access a global memory; and
   modifying, by the compiler executing on the processing system, the global memory access instruction, wherein the modified global memory access instruction utilizes an unused base pointer register of a set of unused base pointer register candidates within the set of code regions, a global variable from the set of global variable candidates to be used as a base address, and an offset relative to the base address to access the global memory.

2. The method of claim 1, further comprising:
   preventing, by the compiler, a linker from removing any global variable based on pre-linker information.

3. The method of claim 1, further comprising:
   preventing, by the compiler, a linker from aligning any global variable in the section that is optimized based on pre-linker information.

4. The method of claim 1, wherein modifying the global memory access instruction considers the memory model in use from a set of architecture memory models.

5. The method of claim 4, further comprising:
   determining a set of associated costs of the modified global memory access instruction and a set of associated costs of the unmodified global memory access instruction.

6. The method of claim 5, wherein the associated cost of the modified global memory access instruction is lower than the associated costs of the unmodified global memory access instruction.

7. The method of claim 5, wherein the associated cost of the modified global memory access instruction includes:
   a type of the unused base pointer register;
   a speed to execute the modified global memory access instruction; and
   a size of the modified global memory access instruction.

8. The method of claim 1, wherein modifying the global memory access instruction is based on a set of constraints.

9. A processing device comprising:
   a target processor instruction memory to store a plurality of target processor instructions that include a plurality of global memory access instructions; and
   a compiler to communicate with the target processor instruction memory, the compiler including:
      a global variable candidate detection module to identify a global memory access instruction within a set of code regions that use a set of global variable candidates to access a global memory; and
      a memory access optimization module to modify the global memory access instruction, wherein the modified global memory access instruction utilizes an unused base pointer register of a set of unused base pointer register candidates within the set of code regions, a global variable from the set of global variable candidates to be used as a base address, and an offset relative to the base address to access the global memory.

10. The processing device of claim 9, the compiler further to:
    prevent a linker from removing any global variable.

11. The processing device of claim 9, the compiler further to:
    prevent a linker from aligning any global variable in the section that is optimized.

12. The processing device of claim 9, wherein the modify the global memory access instruction considers the memory model in use from a set of architecture memory models.

13. The processing device of claim 12, the memory access optimization module further to:

determine a set of associated costs of the modified global memory access instruction and a set of associated costs of the unmodified global memory access instruction.

14. The processing device of claim 13, wherein the set of associated costs of the modified global memory access instruction is lower than the associated costs of the unmodified global memory access instruction.

15. The processing device of claim 13, wherein the associated cost of the modified global memory access instruction includes:
   a type of the unused base pointer register;
   a speed to execute the modified global memory access instruction; and
   a size of the modified global memory access instruction.

16. The processing device of claim 9, wherein modifying the global memory access instruction is based on a set of constraints.

17. A method comprising:
   identifying, by a compiler executing on a processing system, a global memory access instruction within a set of code regions that include a set of global variable candidates to access a global memory; and
   modifying, by the compiler executing on the processing system, the global memory access instruction, wherein the modified global memory access instruction utilizes an unused base pointer register of a set of unused base pointer register candidates within the set of code regions, a global variable from the set of global variable candidates to be used as base address, and an offset relative to the base address to access the global memory, wherein modifying the global memory access instruction is based on a set of associated costs of the modified global memory access instruction and a set of associated costs of the unmodified global memory access instruction.

18. The method of claim 17, further comprising:
   preventing, by the compiler, a linker from removing any global variable.

19. The method of claim 17, further comprising:
   preventing, by the compiler, a linker from aligning any global variable in the section that is optimized.

20. The method of claim 17, wherein modifying the global memory access instruction considers the memory model in use from a set of architecture memory models.

* * * * *